United States Patent
Mason

(10) Patent No.: US 7,136,480 B2
(45) Date of Patent: Nov. 14, 2006

(54) METHODS AND APPARATUS FOR PROCESSING A CALL

(75) Inventor: Andrew Mason, Sunnyvale, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 409 days.

(21) Appl. No.: 10/180,766

(22) Filed: Jun. 26, 2002

(65) Prior Publication Data

US 2004/0001580 A1    Jan. 1, 2004

(51) Int. Cl.
H04M 3/00   (2006.01)
H04M 5/00   (2006.01)

(52) U.S. Cl. .............................. 379/266.02; 379/265.02

(58) Field of Classification Search ........... 379/265.02, 379/265.05, 265.11, 266.02
See application file for complete search history.

(56) References Cited

U.S. PATENT DOCUMENTS

| | | | |
|---|---|---|---|
| 5,511,112 A | 4/1996 | Szlam | |
| 5,561,707 A | 10/1996 | Katz | |
| 5,844,980 A | 12/1998 | Patel et al. | |
| 5,946,386 A * | 8/1999 | Rogers et al. | 379/265.09 |
| 6,044,146 A * | 3/2000 | Gisby et al. | 379/266.02 |
| 6,067,457 A | 5/2000 | Erickson et al. | |
| 6,154,533 A | 11/2000 | Foelker | |
| 6,175,621 B1 | 1/2001 | Begeja | |
| 6,222,920 B1 * | 4/2001 | Walker et al. | 379/266.01 |
| 6,882,641 B1 * | 4/2005 | Gallick et al. | 370/356 |
| 2002/0090075 A1 * | 7/2002 | Gabriel | 379/265.01 |
| 2002/0101979 A1 * | 8/2002 | Borodow et al. | 379/265.02 |
| 2002/0110234 A1 * | 8/2002 | Walker et al. | 379/266.01 |

OTHER PUBLICATIONS

"Cisco: Cisco Personal Assistant", download from http://www.cisco.com/warp/public/cc/pd/unco/persasst/ on May 22, 2002. © 1992-2002 Cisco Systems, Inc. 1pg.

"Cisco Personal Assistant—Enhance Productivity by Streamlining Communications", © 1992-2002 Cisco systems, Inc. 7pgs.

Newton, Harry, "Newton's Telecom Dictionary: The Official Dictionary of Telecommunications Computer Telephony Data Communications Voice Processing PC Telephony Windows 95 & NT Networking and The Internet", Tenth Edition, Feb. 1996. © 1996 Harry Newton. 5pgs.

* cited by examiner

Primary Examiner—Benny Q. Tieu

(57) ABSTRACT

A system, method, apparatus, computer program code, and other embodiments for allowing a call to a busy telephone number extension to be queued and/or handled in accordance with one or more rules. The telephone may be connected to a PBX (Private Branch Exchange) or other switch or otherwise may be connected to a telephone network. In addition, a computer associated with the person also may be connected directly or indirectly to the PBX. A server connected to the PBX via a CTI (Computer Telephone Integration) link may be connected to the computer via a computer network. If a new call arrives at the PBX for the specific extension while the extension is busy, the PBX may notify the server of the call. When multiple incoming calls to the same extension exist, the server may indicate to the PBX how or in what order to queue the calls to the person.

17 Claims, 10 Drawing Sheets

| RULE IDENTIFIER 402 | RULE ACTION 404 | STARTING QUEUE LEVEL 406 | RULE APPLICATION 408 |
|---|---|---|---|
| R-1 | PLAY MESSAGE 1<br>TRANSFER TO VOICE MAIL | 1 | SPOUSE<br>777-7777 |
| R-2 | PLAY MESSAGE 2<br>PLAY MUSIC FOR 30 SECONDS<br>TRANSFER TO 999-9999 | 2 | SALLY JONES<br>JACK MILLER<br>222-2222<br>444-4444 |
| R-3 | PLAY MESSAGE 3<br>PLAY MUSIC FOR 60 SECONDS<br>DECREASE QUEUE LEVEL<br>REPEAT | 5 | BOB JOHNSON<br>888-8888 |
| R-4 | PLAY MESSAGE 4<br>TRANSFER TO VOICE MAIL | 1 | BOSS<br>555-5555<br>SECRETARY |
| DEFAULT | PLAY MESSAGE 5<br>TRANSER TO VOICE MAIL | 10 | ALL OTHERS |

METHODS AND APPARATUS FOR PROCESSING A CALL

FIELD OF THE INVENTION

The present invention relates to a method and apparatus for processing a call to a busy telephone number and, more particularly, embodiments of the present invention relate to methods, means, apparatus, and computer program code for queuing and handling the call.

BACKGROUND OF THE INVENTION

Quite often a person may receive one or more telephone calls while the person is busy with another call or is simply unable or unwilling to take the new call. For example, a salesperson for, a company may receive many calls throughout the day from customers, company representatives, family members, etc. In some circumstances, the salesperson's incoming calls may be placed on hold and be treated identically when the salesperson already is on the phone. However, the salesperson may want to queue or otherwise process the calls in a designated order or otherwise be able to direct how the calls should be queued or processed. For example, if the salesperson is receiving a number of calls, the person may want to queue the incoming calls such that the salesperson takes the calls from customers first, then calls from other company employees, then calls from family members.

It would be advantageous to provide methods, apparatus, computer software and means for allowing a call to a busy telephone number to be queued and/or handled in accordance with one or more rules.

SUMMARY OF THE INVENTION

Embodiments of the present invention provide a system, method, apparatus, means, and computer program code for allowing a call to a busy telephone extension or other number to be queued and/or handled in accordance with one or more rules. The telephone may be associated with a specific person. In addition, the telephone may be connected to a PBX (Private Branch Exchange) or other switch or otherwise may be connected to a telephone network. In addition, a computer associated with the person also may be connected directly or indirectly to the PBX. A server connected to the PBX via a CTI (Computer Telephone Integration) link or connection may be connected to the computer via a computer network. If a new call arrives at the PBX for the specific extension while the extension is busy, the PBX may notify the server of the call. When multiple incoming calls to the same extension exist, the server may indicate to the PBX how or in what order to queue the calls to the person until the person takes the calls or the computer or server instructs the PBX on what to do with one or more of the calls.

Additional advantages and novel features of the invention shall be set forth in part in the description that follows, and in part will become apparent to those skilled in the art upon examination of the following or may be learned by the practice of the invention.

According to some embodiments of the present invention, a method for processing a call may include identifying a call to a busy telephone number; determining at least one rule for queuing the call for the telephone number; providing information regarding the call; and queuing the call for the telephone number in accordance with the at least one rule. In some other embodiments, a method for facilitating processing of a call may include establishing at least one rule for queuing of an incoming call to a telephone number; providing an indication of the at least one rule; receiving information regarding at least one call to the telephone number when the telephone number is busy; and displaying at least a portion of the information. In some further embodiments, a method for processing a call may include identifying a call to a busy telephone number; providing information regarding the call to a device associated with the telephone number; determining at least one rule to apply to the call wherein the at least one rule is associated with the telephone number and involves queuing of the call; and providing information regarding the at least one rule to a device capable of queuing the call.

According to some embodiments of the present invention, a system for processing a call may include a memory; a communication port; and a processor connected to the memory and the communication port, the processor being operative to identify a call to a busy telephone number; determine at least one rule for queuing the call for the telephone number; provide information regarding the call; and queue the call in accordance with the at least one rule. In some other embodiments, a system for processing a call may include a memory; a communication port; and a processor connected to the memory and the communication port, the processor being operative to establish at least one rule for queuing of an incoming call to a telephone number; provide an indication of the at least one rule; receive information regarding at least one call to the telephone number when the telephone number is busy; and display at least a portion of the information. In some further embodiments, a system for processing a call may include a memory; a communication port; and a processor connected to the memory and the communication port, the processor being operative to identify a call to a busy telephone number; provide information regarding the call to a device associated with the telephone number; determine at least one rule to apply to the call wherein the at least one rule is associated with the telephone number and involves queuing of the call; and provide information regarding the at least one rule to a device capable of queuing the call.

According to some embodiments of the present invention, a computer program product in a computer readable medium for processing a call may include first instructions for determining that a call is directed to a busy telephone number; second instructions for identifying at least one rule for queuing said call for said telephone number; third instructions for sending information regarding said call; and fourth instructions for positioning said call in a call order in accordance with said at least one rule. In some other embodiments, a computer program product in a computer readable medium for facilitating processing of a call may include first instructions for facilitating creation of at least one rule for queuing of an incoming call to a telephone number; second instructions for sending an indication of the at least one rule; third instructions for obtaining information regarding at least one call to the telephone number when the telephone number is busy; and fourth instructions for facilitating display at least a portion of the information. In some further embodiments, a computer program product in a computer readable medium for processing a call may include first instructions for determining a call to a busy telephone number; second instructions for sending information regarding the call to a device associated with the telephone number; third instructions for identifying at least one rule to apply to the call wherein the at least one rule is associated with the telephone number and involves queuing of the call; and fourth instructions for sending information regarding the at least one rule to a device capable of queuing the call.

According to some embodiments of the present invention, an apparatus for processing a call may include means for determining that a call is directed to a busy telephone number; means for identifying at least one rule for queuing said call for said telephone number; means for sending information regarding said call; and means for positioning said call in a call order in accordance with said at least one rule. In some other embodiments, an apparatus for facilitating processing of a call may include means for facilitating creation of at least one rule for queuing of an incoming call to a telephone number; means for sending an indication of the at least one rule; means instructions for obtaining information regarding at least one call to the telephone number when the telephone number is busy; and means for facilitating display at least a portion of the information. In some further embodiments, an apparatus in a computer readable medium for processing a call may include means for determining a call to a busy telephone number; means for sending information regarding the call to a device associated with the telephone number; means for identifying at least one rule to apply to the call wherein the at least one rule is associated with the telephone number and involves queuing of the call; and means for sending information regarding the at least one rule to a device capable of queuing the call.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 8 is an illustration of a rule editor or interface that may be used to create the rule database of FIG. 7;

DETAILED DESCRIPTION

Applicant has recognized that there is a need for systems, means, computer code, and methods that allow a call to a busy extension or other number to be queued and/or handled in accordance with one or more rules. For example, suppose a person at a specific telephone extension is busy on a call at that extension. The telephone may be connected to a PBX (Private Branch Exchange) or other switch or device (e.g., PABX) or otherwise may be connected to a telephone network. In addition, a computer associated with the person also may be connected directly or indirectly to the PBX. A server connected to the PBX via a CTI (Computer Telephone Integration) link may be connected to the computer via a computer network. If a new call arrives at the PBX for the specific extension while the extension is busy, the PBX may notify the server of the call. The server may then identify or otherwise determine how to queue or handle the call in accordance with one or more rules established by the person. In addition, the server may provide information to the computer regarding the call (e.g., the telephone number calling), which may then display the information for use by the person. The person can then decide whether to handle the new call (e.g., by placing the current call on hold) or to send the new call to voice mail. When multiple incoming calls to the same telephone number, the server may indicate to the PBX how or in what order to queue the calls to the person until the person takes the calls or the computer or server instructs the PBX regarding what to do with one or more of the calls (e.g., forward them to a different telephone number, forward them to voicemail). Thus, multiple calls to the same busy telephone number can be queued for the telephone number in accordance with one or more rules. The person may change the queuing order dynamically or allow the calls to remain queued according to the rule(s). These and other features will be discussed in further detail below, by describing a system, individual devices, and processes according to embodiments of the invention.

System

Figure 1:
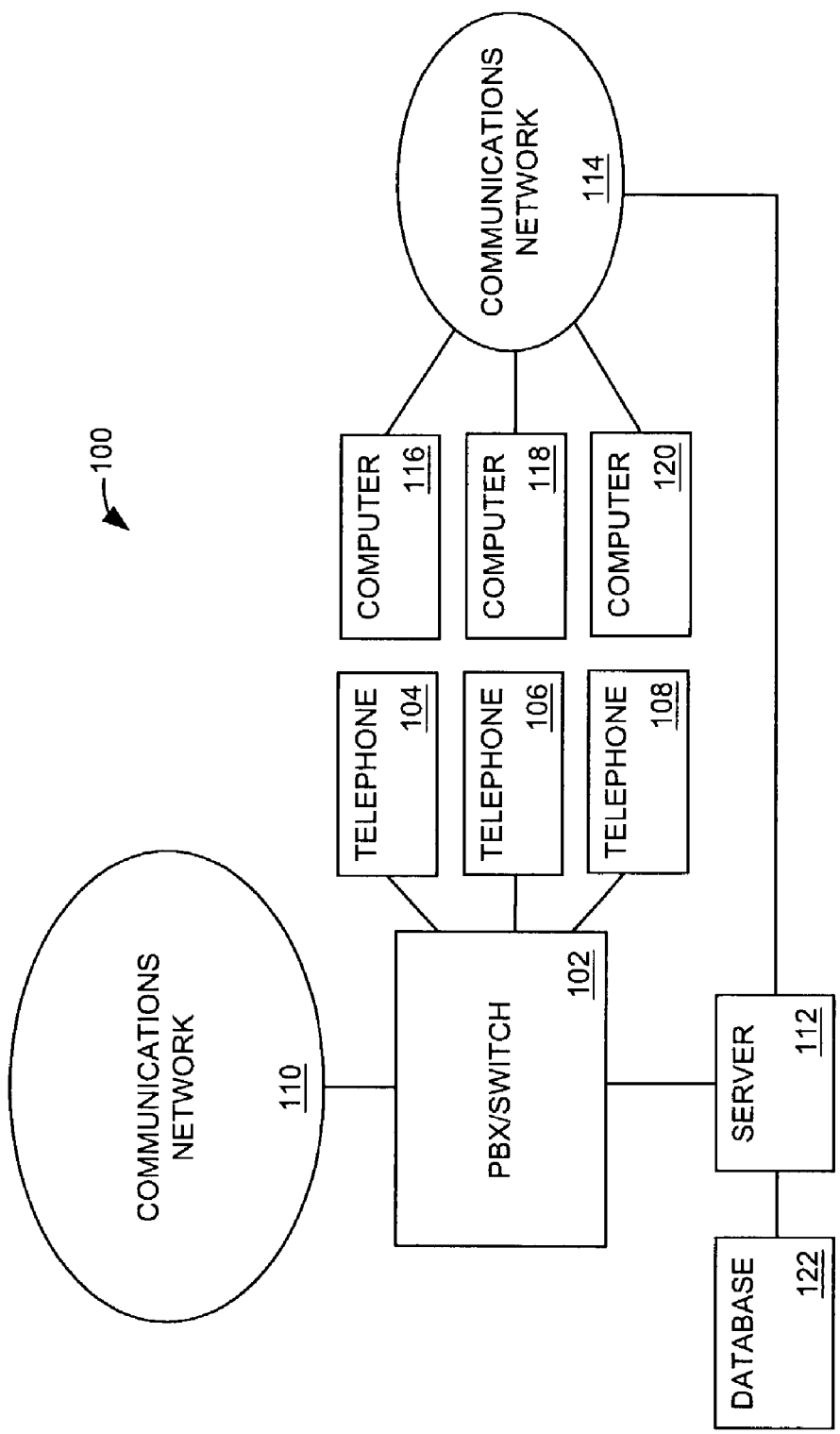
FIG. 1 is a block diagram of components for a first embodiment of a system in accordance with the present invention.

Now referring to FIG. 1, an apparatus or system 100 usable with the methods disclosed herein is illustrated. The apparatus 100 may include a PBX or other switch or device 102 supporting for routing calls to one or more telephones 104, 106, 108 from other telephones connected to the PBX/switch 102 or calls originating from telephones or other devices connected to a communications network 110. The telephones 104, 106, 108 may be directly or indirectly connected to the PBX/switch 102. In some embodiments, one or more of the telephones 104, 106, 108 may have more than one telephone number or extension associated with them.

The PBX/switch 102 may be connected to a server 112. The server 112 may communicate via a communications network 114 with one or more computers, workstations, terminals or other devices 116, 118, 120. In some embodiments, the server 112 may be connected directly to one or more of the computers 116, 118, 120.

The server 112 also may access a resource (e.g., a database) 122 that may be connected directly or indirectly (e.g., via the communications network 114) to the server 112 and may be local or remote to the server 112. In some embodiments, the PBX/switch 102 may be connected to the server 112 via the communications network 114 or via a CTI link. In some embodiments, the PBX/switch 102 also may act as the server 112 or incorporate some or all of the components or functions of the server 112, or vice versa.

Thus, in some embodiments the PBX/switch 102 and the server 112 may be a single or integrated device or apparatus.

As will be discussed in more detail below, a person may be associated with a telephone and a computer. For example, the telephone 104 and the computer 116 may be associated with the same person and be located in the person's office. Thus, for purposes of further discussion of the present invention, the respective pairs of telephones and computers 104 and 116, 106 and 118, and 108 and 120 are assumed to be associated with each other. This may comprise an association of their respective telephone numbers or extensions and computer or electronic addresses. In some embodiments, a telephone and a computer might be part of a single device. For example, the telephone 104 and the computer 116 might be part of the same device. As another example, the computer 116 may include telephone capabilities such that it also operates as or like the telephone 104.

The server 112 can comprise a single device or computer, a networked set or group of devices or computers, a workstation, etc. In some embodiments, the server 112 also may function as a database server and/or may include the database 122.

In some embodiments, the communications network 110 may be or include a telephone, cellular or other network used for the transmission of telephone calls. The communications network 110 may route calls to and from the PBX/switch 102 and/or the telephones 104, 106, 108.

The communications network 114 might be or include the Internet, the World Wide Web, or some other public or private computer, cable, telephone, client/server, peer-to-peer, or communications network or intranet. The communications network 114 is meant only to be generally representative of cable, computer, telephone, peer-to-peer or other communication networks for purposes of elaboration and explanation of the present invention and other devices, networks, etc. may be connected to the communications network 114 without departing from the scope of the present invention. The communications network 114 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

As previously discussed above, the server 112 may receive information from the PBX/switch 102 regarding one or more calls to the telephones 104, 106, 108. When the server 112 receives a notification from the PBX/switch 102 that a call has arrived at an extension (e.g., number for the telephone number 104), the server 112 may notify the computer associated with the telephone (e.g., the computer 116) of the call and provide information to the computer regarding the call. The information may include information regarding the calling telephone number associated with the call. The calling telephone number may be determined by the PBX/switch 102 using caller identification, automatic number identification, etc. The server 112 may then access a database or other resource (e.g., the database 122) to obtain information associated with the calling telephone number. Such information might include the name of the caller, the residence address of the caller, a caller identification number, purchasing or calling history of the caller, credit history of the customer, relative importance of the calling party or telephone number compared to current or existing calls, etc. In some embodiments, the relative importance of one call versus one or more other calls may be established by a rule or other designated criteria, algorithm, procedure, etc. Different information may be used in different uses of the system 100 or embodiments of the present invention. The server 112 also may access the database 122 or another resource to determine which computer is associated with the telephone extension being called. The server 112 may provide some or all of the information it obtains from the PBX/switch 102 and/or the database 122 to the computer associated with the telephone receiving the call.

Figure 2:
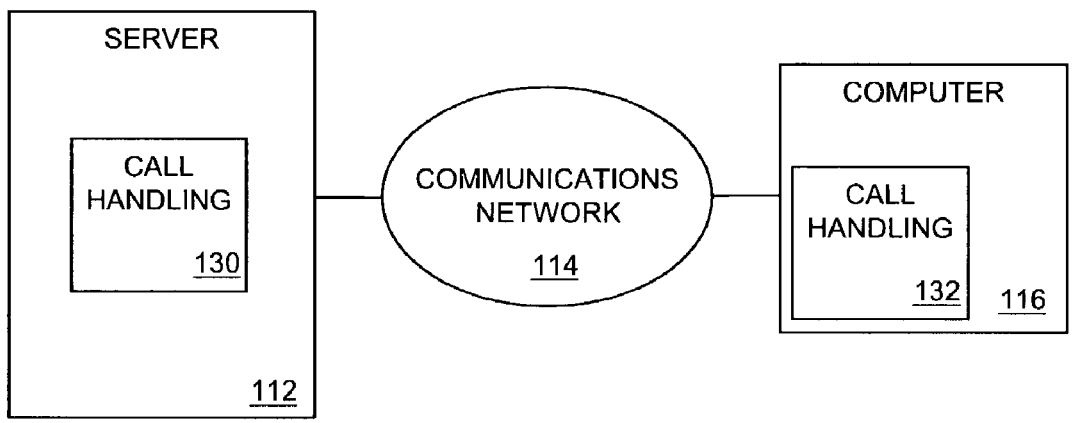
FIG. 2 is a more detailed block diagram of the server and one of the computers of FIG. 1.

Now referring to FIG. 2, a more detailed illustration of the server 112 and the computer 116 is provided. The computer 116 may be associated with the telephone 104 or one or more extensions provided at or otherwise associated with the telephone 104. The server 112 may include call handling software or other control application 130 that helps the server 112 interface or communicate with the PBX/switch, which may involve the use of standard protocols such as the CSTA (Computer Supported Telecommunications Application) III standard. In addition, the call handling application 130 may interface or communicate with call handling software or application 132 operating on the computer 116. The call handling application 132 operating on the computer 116 can accept information from the server 112, or the calling handling application 130 operating on the server 112, and provide commands to the server 112, or to the call handling application 130 operating on the server 112, regarding one or more calls. In addition, the call handling software 132 may provide or display call information on the computer 116 and may allow a person to enter or create commands or call control rules regarding how to process or queue one or more calls.

Many different types of implementations or hardware configurations can be used in the system 100 and with the methods disclosed herein and the methods disclosed herein are not limited to any specific hardware configuration for the system 100 or any of its components.

Process Description

Figure 3:
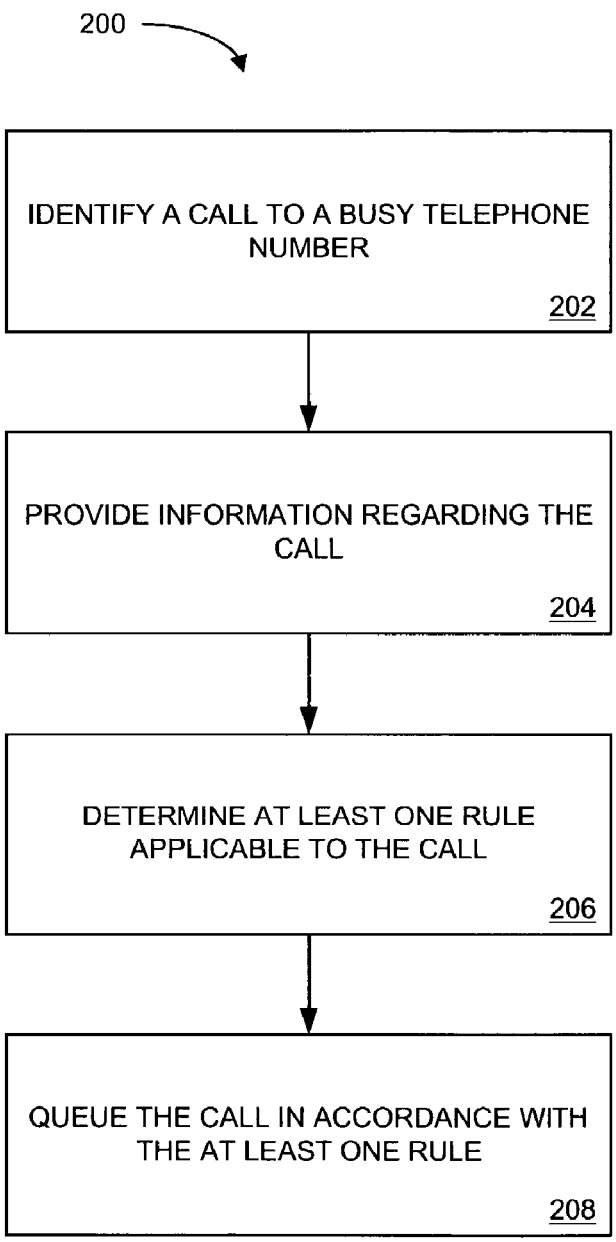
FIG. 3 is a flowchart of a first embodiment of a method in accordance with the present invention and usable with the system of FIG. 1.

Reference is now made to FIG. 3, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable. In some embodiments, some or all of the steps of the method 200 may be performed or completed by the PBX/switch 102 and/or the server 112. For purposes of discussion, the method 200 is assumed to be performed by the PBX/switch 102.

Processing begins at a step 202 during which an incoming call to a busy extension or other telephone number is identified or otherwise determined. For example, an incoming call may be directed to an extension provided on or by the telephone 104. The PBX/switch 102 may determine the extension and its associated telephone.

In some embodiments, a telephone number may be busy if it is being used with or for another call. In some embodiments, if a telephone has more than one extension associated with it, a first extension for the telephone may be considered busy if a second extension associated with the telephone is being used with another call. In some embodiments, a telephone number also may be considered as busy if the number's associated telephone is out of order, is off-hook, is indicated as being in a busy or "do not disturb" state, or does not respond to control signals sent to it. In some embodiments, a telephone number may be considered busy in accordance with other designated procedures or call evaluation techniques.

During a step 204, information regarding the call and/or the telephone number may be provided to another device or application. For example, if the PBX/switch 102 is implementing the step 206, the PBX/switch 102 may provide information regarding the call, the telephone number, the name of the person associated with the telephone number, etc. to the server 206. The server 102 may then provide some or all of the information to the computer associated with the telephone number for the call. In some embodiments, the method 200 or the step 204 may include determining the information to be provided during thee step 204. For example, the PBX/switch 102 may use caller identification or automatic line identification to identify the number or party the call is originating from and provide such information during the step 204.

As previously discussed above, in some embodiments, the PBX/switch 102 may incorporate the server 112 or the functions of the server 112. Thus, the step 204 may include providing information regarding a call, calling party, etc. directly to a computer.

During a step 206, one or more rules are determined that are to be applied to the call identified during the step 202. For example, in some embodiments, the PBX/switch 102 may store or have access to one or more established rules regarding how to queue multiple calls to an extension. Thus, the step 206 or the method 200 may include retrieving or otherwise obtaining rule information from a database or other device, application or resource.

In some embodiments, the server 112 may store or have access one or more rule(s) and provide the information to the PBX/switch 102 after receiving extension number information from the PBX/switch 102 as a result of the step 204. The server 112 may then provide the rule(s) to the PBX/switch 102 or provide commands or instructions to the PBX/switch 102 regarding how to process the call in accordance with the rule(s). Thus, in some embodiments the step 206 may include receiving or retrieving information from the server 112 or another device regarding one or more rules to apply to a call. The rule(s) may be established by or by using a computer associated with the busy telephone number, as will be discussed in more detail below.

As previously discussed above, in some embodiments, the PBX/switch 102 may incorporate the server 112 or the functions of the server 112. Thus, the step 206 may include retrieving or receiving information regarding a rule from a computer or other device. In such embodiments, the step 206 may occur before the step 204.

There may be many different kinds of rules that govern queuing or other handling of a telephone call. Without such rules, multiple incoming calls on the extension will be queued in order of arrival. Queuing rules allow a person to establish how multiple calls received at an extension will be queued. Calls from some designated calling numbers or parties may be queued higher than calls from other designated calling numbers or parties in accordance with one or more rules. For example, a person may want to prioritize or queue calls coming from numbers associated with his or her boss or spouse ahead of other calls associated with other calling numbers or parties, even if such other calls arrived earlier than the calls associated with the person's boss or spouse. If the person currently is busy on an extension and multiple telephone calls are received at the extension, the person may want to have the telephone calls from the boss or spouse moved higher in the queue. As another example, a person may want to prioritize different customers differently so that calls from the most important customers are prioritized higher in the queue.

In some embodiments, a rule may govern have a queued call is displayed on a computer (e.g., the computer 116). For example, the call handling software or application 132 operating on the computer 116 may create different alerts or signals to be displayed for one or more queued calls. For example, a call having a queue level status of "1" may blink, etc. while a call having a queue level status of "2" may simply be highlighted. The calling handling software 132 may create an audible indictor to alert a user to calls. Different calls having different queue levels may create different visual and/or audible alerts or have different visual and/or audible alerts associated with them, as specified in one or more rules.

In some embodiments, a person may establish one or more rules to apply to calls to an extension prior to the calls arriving. If the person is busy with a call and other calls arrive for the person, the pre-established queuing rules may be used to queue the other calls for the user automatically. Alternatively, or in conjunction, the person may select a rule after the call has arrived and indicate that the rule should be applied to the call. For example, suppose an incoming call is directed to a busy extension operating on the telephone 104 and that the computer 116 is associated with the telephone 104. Information regarding the number from where the call originated may be provided to the computer 116 and displayed by the computer 116 to the person using the telephone 104. The person may use the computer 116 and the displayed information to select a rule to govern how the call should be processed or queued while the extension is busy. Information regarding the selected rule may be passed from the computer 116 to the server 112 and onto the PBX/switch 102 for implementation or use with the call.

During a step 208, the call determined during the step 202 is queued in accordance with the at least one rule determined during the step 206. In some embodiments, the method 200 may include providing information regarding the status of a queue of calls, changing a queue of calls, etc. For example, the PBX/switch 102 may provide information to the server 112 on a continuous, as-needed, or periodic basis regarding calls in a queue for one or more extensions. The server 112 may provide some or all of the information to one or more of the computers 116, 118, 120.

In some embodiments, the method 200 may include one or more of the following: applying a second rule to an incoming call directed to a telephone number when the telephone number is no longer busy, routing a call to a telephone number when the telephone number is no longer busy, determining that a telephone number is busy, providing an indication that a telephone number is busy, identifying a calling number or party associated with a call, identifying a person associated with a called telephone number, identifying a receiving telephone number or party associated with a call, etc.

Figure 4:
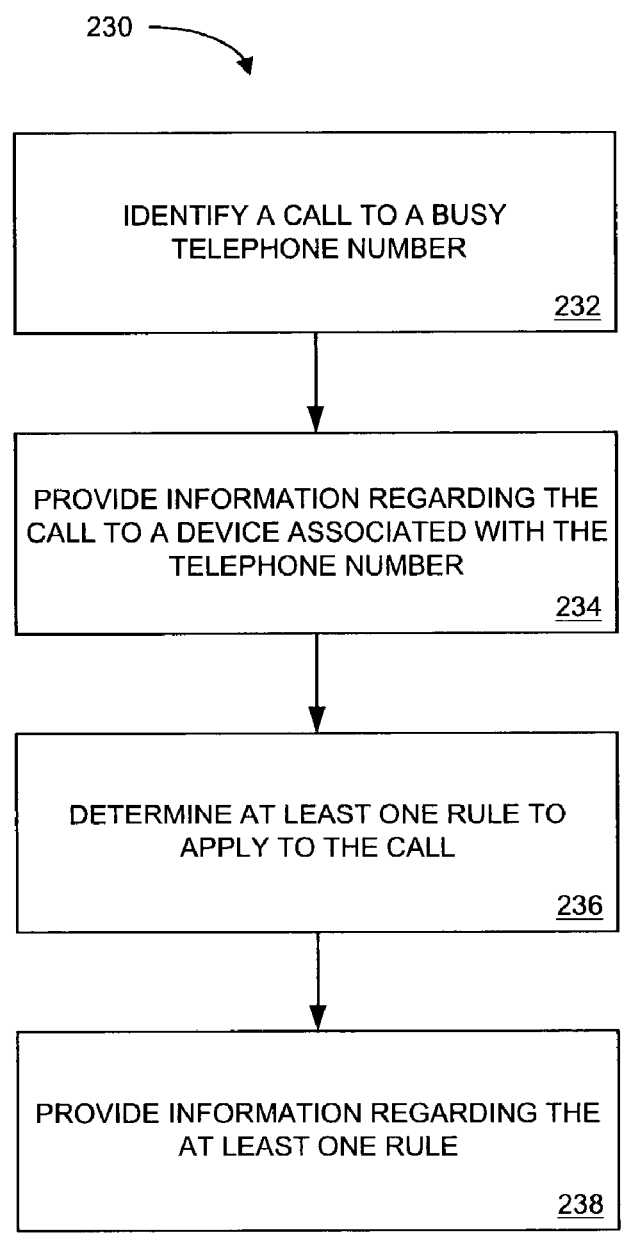
FIG. 4 is a flowchart of a second embodiment of a method in accordance with the present invention and usable with the system of FIG. 1.

Reference is now made to FIG. 4, where a flow chart 230 is shown which represents the operation of a second embodiment of the present invention. The particular arrangement of elements in the flow chart 230 is not meant to imply a fixed order to the steps; embodiments of the present invention can be practiced in any order that is practicable. In some embodiments, some or all of the steps of the method 230 may be performed or completed by the PBX/switch 102 and/or the server 112. For purposes of discussion, the method 230 is assumed to be performed by the server 112.

Processing begins at a step 232 during which a call to a busy telephone number is identified. In some embodiments, the step 232 may operate in a manner similar to the step 202 previously discussed above. In other embodiments, the server 112 may conduct or implement the step 232 by receiving information from the PBX/switch 102 regarding an incoming call as previously discussed above.

During a step 234, information regarding the call or telephone number is provided to a device associated with the extension. For example, if the call is associated with an extension operating on the telephone 104, the server 112 may provide information regarding the call to the computer 116. The server 112 may obtain additional information regarding the calling number or calling party by accessing the database 112. The server 112 may then provide such information to the computer 116 as part of the step 234. In some embodiments, the step 234 or the method 230 may include identifying or otherwise determining a device associated with the called telephone number (e.g., one of the computers 116, 118, 120).

During a step 236, one or more rules are determined that are to be applied to the call identified during the step 232. For example, in some embodiments, the server 112 may store or have access to one or more established rules regarding how to queue multiple calls to an extension. Thus, the step 236 or the method 230 may include retrieving or otherwise obtaining rule information from a database (e.g., the database 122) or other device, application or resource. In some embodiments, the server 112 may receive information regarding one or more rules to apply to the call from a computer before or during the call. The information may be received prior to or during the call. The computer (e.g., the computer 116) may be associated with the busy telephone number, a telephone (e.g., the telephone 104) associated with the busy telephone number, and/or a person associated with the busy telephone number or the number's associated telephone.

During a step 238, information regarding the at least one rule determined during the step 236 is provided. For example, in some embodiments, the server 112 may store, obtain or have access one or more rule(s) and provide the rule information to the PBX/switch 102 after receiving extension number information from the PBX/switch 102 as a result of the step 234. The server 112 may then provide the rule(s) to the PBX/switch 102 or provide commands or instructions to the PBX/switch 102 regarding how to process the call in accordance with the rule(s).

Figure 5:
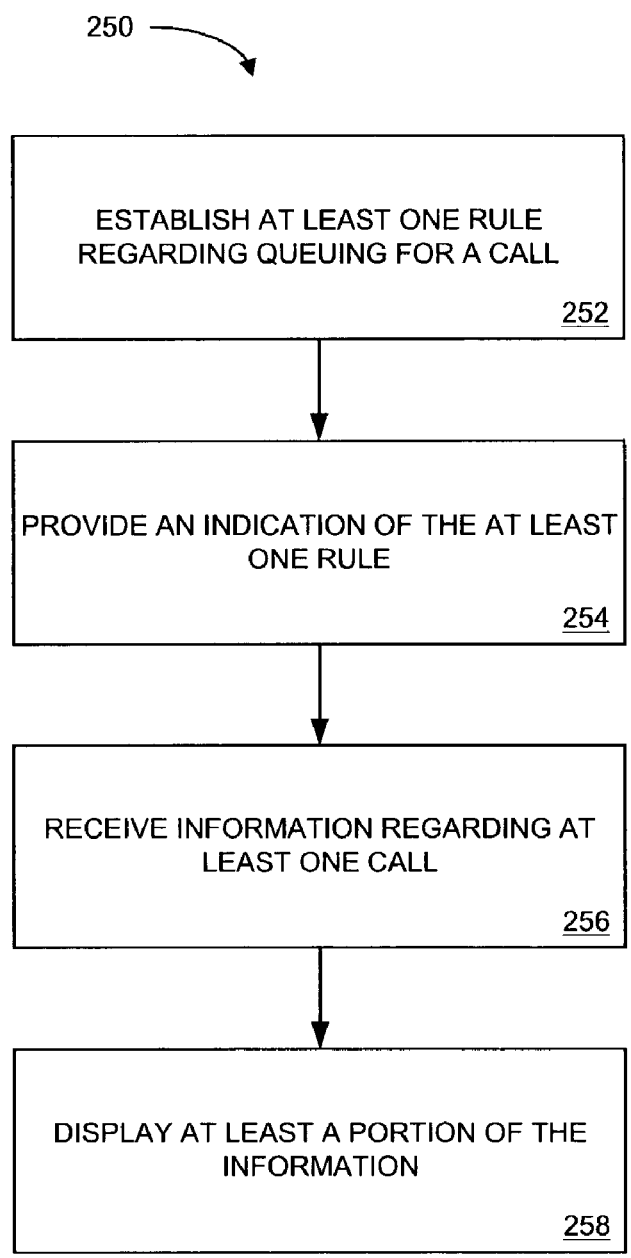
FIG. 5 is a flowchart of a third embodiment of a method in accordance with the present invention and usable with the system of FIG. 1.

Reference is now made to FIG. 5, where a flow chart 250 is shown which represents the operation of a second embodiment of the present invention. The particular arrangement of elements in the flow chart 250 is not meant to imply a fixed order to the steps; embodiments of the present invention can be practiced in any order that is practicable. In some embodiments, some or all of the steps of the method 250 may be performed or completed by the server 112 and/or by one of the computers 116, 118, 120. For purposes of discussion, the method 250 is assumed to be performed by the computer 116.

Processing begins at a step 252 during which at least one rule is established regarding queuing or other processing for an incoming call. For example, the computer 116 may allow a person to establish or select one or more rules that may be used for queuing or processing one or more calls. Further discussion of this concept is provided below.

During a step 254, information regarding the rule(s) established during the step 254 is provided. For example, the computer 116 may provide information regarding the rule(s) to the server 112 and/or the PBX/switch 102. The computer 116 may provide updated information when it becomes available (e.g., a new or different rule is established) or when queried by the server 112 for such updated information.

During a step 256, information is received regarding a call. For example, the computer 116 may receive information from the server 112 regarding a call to an extension associated with the telephone 104.

In some embodiments, the computer 116 may be used to establish one or more rules to apply to a call prior to the call arriving. In such embodiments, the steps 252 and 254 may occur prior to the step 256. In other embodiments, the computer 116 may be used to select or otherwise establish a rule to apply to a call after the call has arrived. In such embodiments, the step 256 may occur prior to the steps 252 and 254.

Figure 6:
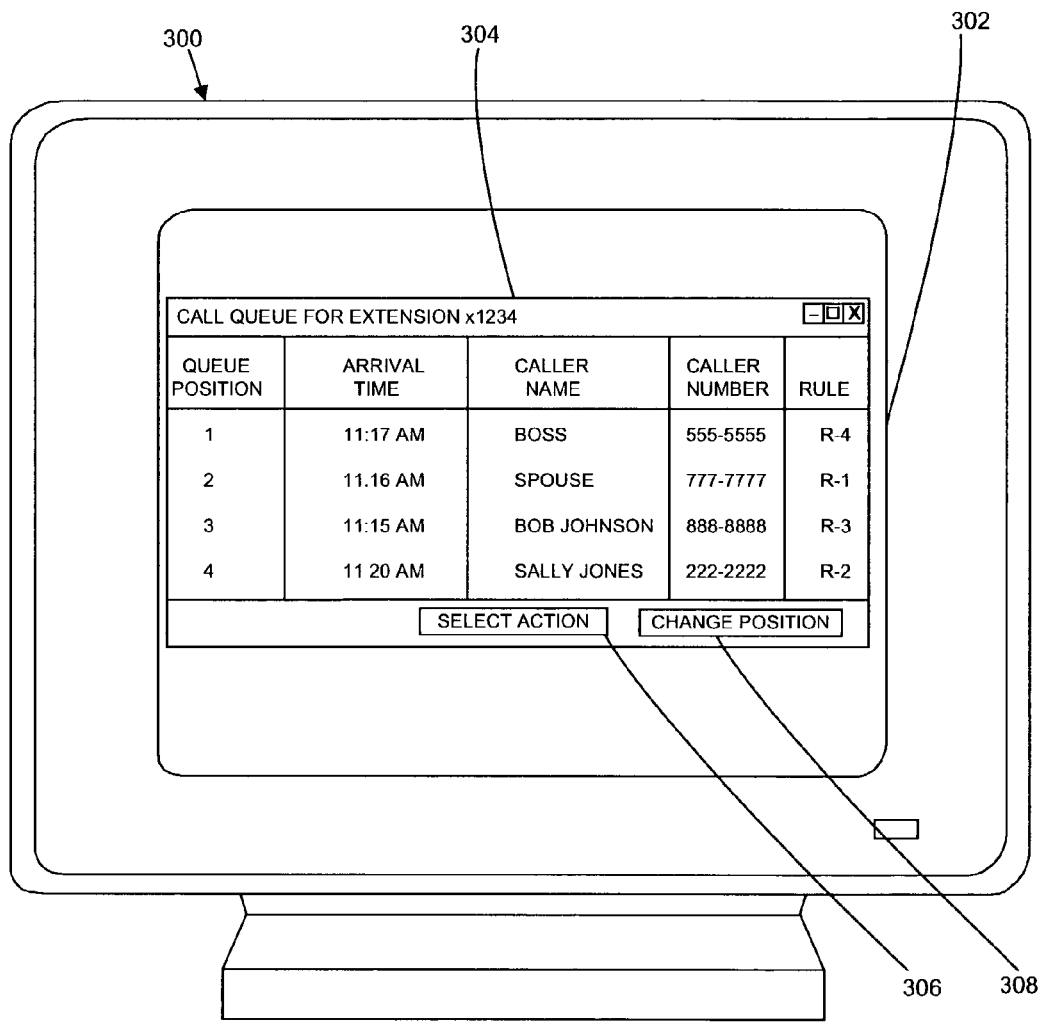
FIG. 6 is an illustration of a window displaying queuing of calls that may be displayed by the computer of FIG. 2.

During a step 258, the computer 112 may display some or all of the information received during the step 256 so that a person using the computer 116 or the telephone 104 is aware of the call, the rule being applied to the call, the order of the call in a queue, etc. For example, now referring to FIG. 6, a monitor 300 that may be part of the computer 116 is illustrated.

The monitor 300 includes a screen 302 on which a window or interface 304 is displayed that shows information regarding four queued calls to an extension "x1234". Presumably the four calls are in the queue since the extension "x1234" is already in use or is otherwise busy. In some embodiments, the window 304 also might display information regarding the call in progress on the extension as well as the queued calls. As shown in the window 304, the four different calls are from the telephone numbers identified as "555-5555", "777-7777", "888-8888" and "222-2222" and the calling parties identified as "BOSS", "SPOUSE", BOB JOHNSON" and "SALLY JONES" respectively.

Different rules identified as "R-4", "R-1", "R-3" and "R-2" have been applied to the four different calls. The call from the party identified as "BOSS" is in position "1" of the queue and arrived at 11:17 AM, which is after the calls in positions "2" and "3" of the queue. The rule "R-4" associated with the call from the party identified as "BOSS" may designate or establish that such calls get the highest priority in the queue. Similarly, the rule "R-1" associated with the call from "SPOUSE" may designate or establish that calls from the party identified as "SPOUSE" get queued higher than all other calls except for calls from the party identified as "BOSS".

In some embodiments, a user of the interface or window 304 may be able to select one of the queued calls and an action or rule to be applied to the call. For example, even though the rule "R-1" is being applied to the call in queue position "2", the user, may want to play a prerecorded message to the caller, direct the call to another extension, direct the call to voicemail, etc., instead of whatever actions might be applied in accordance with the rule "R-1". Thus, the user may select the call by clicking on or selecting the one of the terms "2", "SPOUSE", or "777-7777" and going to an action or rule menu or window by selecting or clicking on button 306. Alternatively, different action buttons that the user can select may be presented on or by the window 304.

In some embodiments, a user of the interface or window 304 may be able to change queue positions of callers as they appear on the screen, despite the queue positions established by the application of one or more rules. For example, while the user is on the phone with another caller, the user may decide to move the caller identified as "SALLY JONES" ahead of the caller identified as "BOB JOHNSON" in the illustrated queue by selecting or clicking on of the terms "4", "11:20 AM", "SALLY JONES" or "222-2222" and dragging it above the terms "3", "11:15 AM", "BOB JOHNSON" or "888-8888" in the window 304. The user also may be able to indicate a change of queue position by selecting or clicking on a change queue position button 306 which may prompt or direct the user in changing the order of two or more of the four callers in the window 304.

In some embodiments, the window 304 or the software 132 operating on the computer 116 may display or cause different alerts to happen for one or more queued calls. For example, a call having a queue level status of "1" may be highlighted, may blink, etc. As another example, the window may cause a call having a queue status of "1" to blink at a faster rate or be displayed in an increasing font size over time as the call remains unanswered or on hold. In a further example, the software 132 or the computer 116 may create an audible indictor to alert a user to calls. Different calls having different queue levels may create different visual and/or audible alerts or have different visual and/or audible alerts associated with them.

Figure 7:
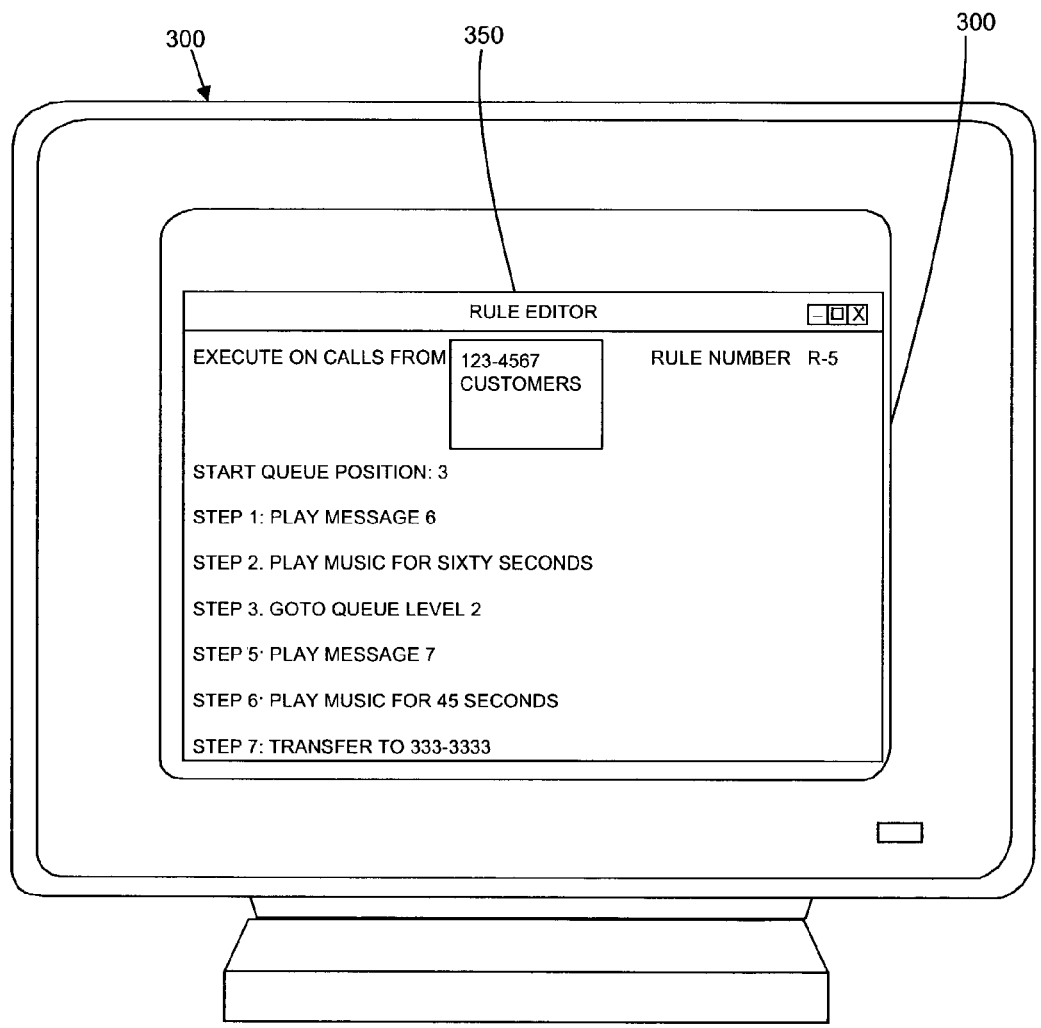
FIG. 7 is an illustration of a rule database that may be used to queue the calls displayed in the window of FIG. 6.

Now referring to FIG. 7, a representative use interface, window or dashboard 350 displayed on the monitor 300 may be used to create one or more rules. The user of the interface 350 may use the interface 350 to enter information regarding the names or telephone numbers of one or more callers to who the rule will apply, the starting queue position or number for the incoming call for which the rule applies, one or more steps that comprise the rule, etc. For example, the rule identified as "R-5" in the window 350 applies to calls from the number "123-4567" or from people designated as "CUSTOMERS". The people designated as "CUSTOMERS" may be calling from a number of different telephone numbers. Once the server 112 gets information regarding the telephone number a call is coming or originating from, the server 112 may access a database to determine if any of the telephone numbers are associated with "CUSTOMERS". Alternatively, the interface 350 may be used to associate call originating telephone numbers with the designation "CUSTOMERS" and may send the information to the server 112.

As illustrated in the window 350 of FIG. 7, the rule "R-5" includes seven steps and a starting queue position of "3". The seven steps may comprise or include a script associated with the rule "R-5". For a call to which the rule "R-5" is applied, the call is placed in queue position "3" and a message designated as "message 6" is played to the caller. If the call has not been picked up or if the caller has not disconnected, after "message 6" has ended, music is played to the caller for sixty seconds. If the call has not been picked up or if the caller has not disconnected, the queue level associated with the call is increased from "3" to "2", "message 7" is played, and then music is played for forty-five seconds. If the call still has not been picked up or if the caller still has not disconnected by this time, the call is transferred to telephone number "333-3333".

In some embodiments, the interface 350 may include one or more icons or buttons (e.g., a "Play Message" button, a "Forward Call" button, a "Send to Voicemail" button) or similar selections from a pull down menu that a user can select or drag to indicate a step. The user may then be prompted or request to provide additional information for the step (e.g., select a specific message to be played, enter a specific telephone number to forward a call).

In some embodiments, the interface 350 may allow a user to designate what happens when an incoming call is detected by the computer 116, what kind of alerting is used with different queue levels, etc. For example, an incoming call having a queue number of "1" may cause the call originating telephone number to blink or flash on the screen while an incoming call having a queue number of "3" may simply be displayed in a designated color. Thus, a queue level may equate to the type of indicator displayed in the interface or window 304 of FIG. 6.

In addition, a user of the interface 350 may be able to designate what happens or which rule controls when two or more rules conflict. For example, if two incoming calls to a busy extension have a queue priority level of "1", a rule may specify that the earliest of the two incoming calls with a priority of "1" have priority of over the second incoming call with a priority of "1" while the second of two incoming calls with have priority over other incoming calls.

In some embodiments, information regarding one or more rules may be stored in a rule information database, some or all of which may reside in a computer (e.g., the computer 116), the server 112, the database 122, and/or the PBX/switch 102. Now referring to FIG. 8, an illustration of a representative rules database 400 is presented.

The rules database 400 may include a rule identifier field 402 that may include codes or other identifiers for one or more rules, a rule action field 404 that may include one or more steps or actions that take place when a rule is implemented, a starting queue level field 406 that may indicate the starting queue level and/or alert type or level for an incoming call processed in accordance with one of the rules identified in the field 402, and a rule application field 408 that may designate or indicate what callers, calling telephone numbers, etc. are associated with the rules identified in the field 402.

Other or different fields also may be used in the rule information database 400. For example, in some embodiments a rules database may include information regarding when a rule was established, when a rule should used (e.g., only during normal hours) or not be used (e.g., not on the weekends), the last time a rule was edited or changed, the alerting type designated with a particular rule or queue level, etc.

As illustrated by the rule information database 400 of FIG. 8 the rule identified as "R-3" in the field 402 repeats or loops. In some embodiments, a rule also may include a conditional or branching statement such that the rule may produce different outcomes in different circumstances.

Also as illustrated by the rule information database 400, a default rule may be established for use when no other rule in the rules database 400 applies to an incoming call. For example, the "DEFAULT" rule in the rules database 400 causes "message 5" to be played to the caller, after which the caller is transferred to voicemail. The caller starts in a queue position of "10".

In some embodiments, if a call starts in a designated queue position as established by a rule being applied to the call, and no calls exist in one or more queue positions lower than its starting queue position, the call may be moved automatically to a lower queue position.

Figure 9:
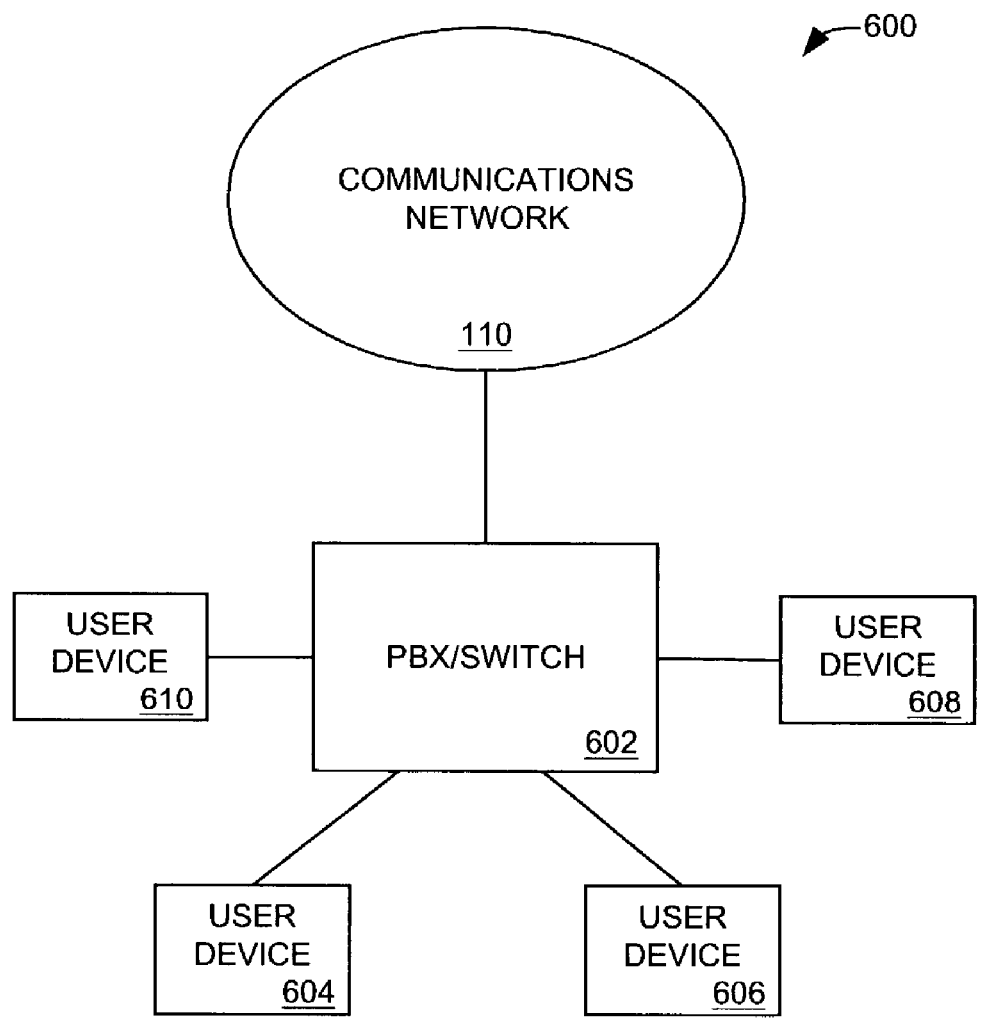
FIG. 9 is a block diagram of components for a second embodiment of a system in accordance with the present invention.

As previously mentioned above, in some embodiments a server and a PBX/switch may be combined within the same physical device. The server and the PBX/switch may comprise different logical elements within the same physical device. In addition, or alternatively, in some embodiments a telephone (e.g., the telephone 104) and a computer (e.g., the computer 116) may be integrated into a single device. For example, now referring to FIG. 9, a system 600 is shown having a PBX/switch 602 connected to the communications network 110 and to user devices 604, 606, 608, 610. The PBX/switch 602 may include the functions, capabilities and services of the PBX/switch 102 and the server 112 previously discussed above. The user device 604 may include the functions, capabilities and services of the telephone 104 and the computer 116 previously discussed above. One or more control or signaling lines or links may exist between the PBX/switch 602 and each of the user devices 604, 606, 608, 610.

Server and PBX/Switch

Figure 10:
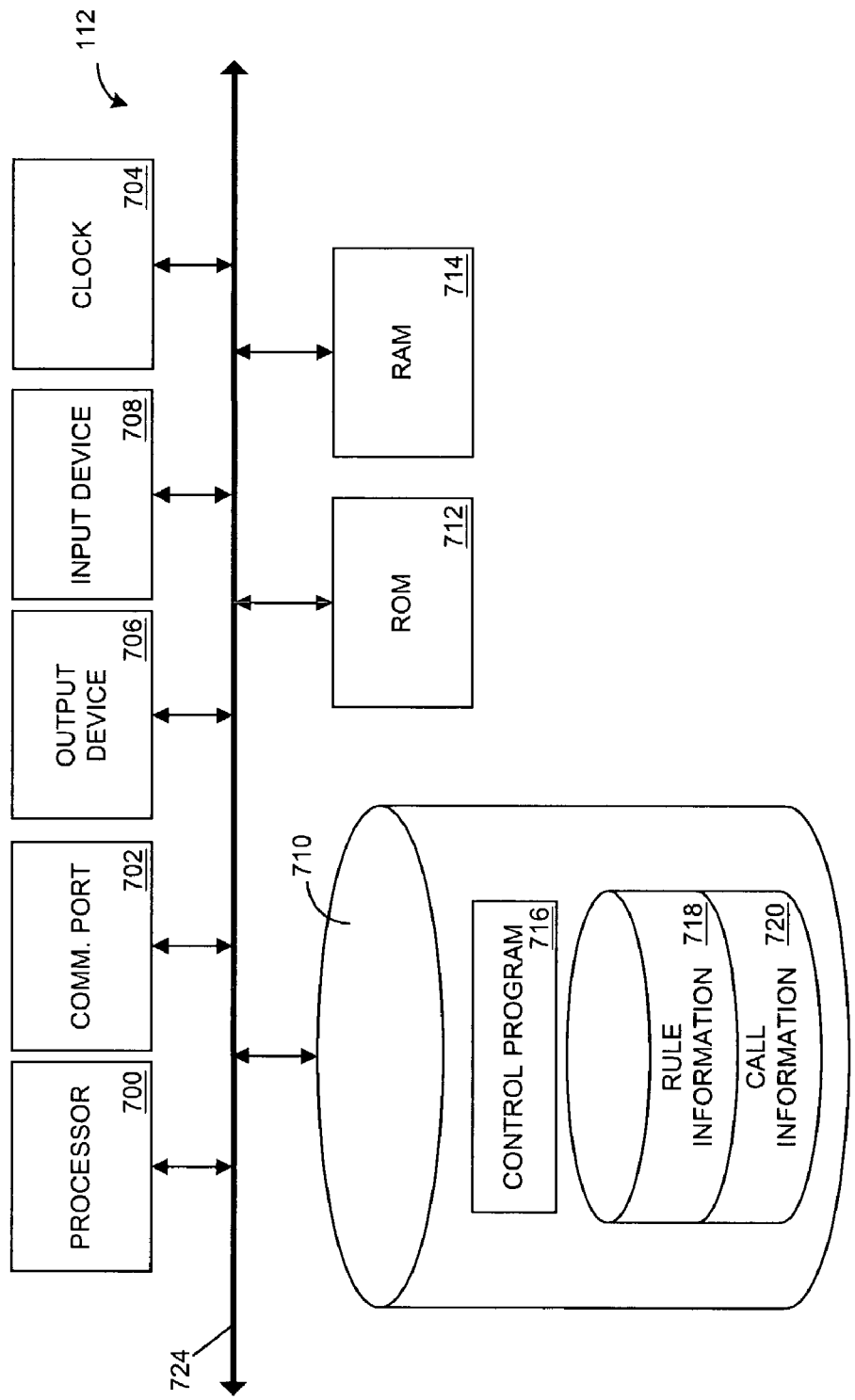
FIG. 10 is a block diagram of components for an embodiment of the server of FIG. 2.

Now referring to FIG. 10, a representative block diagram of the server or controller 112 is illustrated. In some embodiments, the PBX/switch 102 may include some or all of the components shown in FIG. 10. For purposes of ease of explanation, the following discussion will relate only to the server 112. However, it is understood that the following discussion of hardware and software components also may apply to the PBX/switch 102 and that the PBX/switch may include some or all of the same hardware and/or software components. Also, as previously discussed above, in some embodiments the PBX/switch 102 and the server 112 may be integrated together in a single device, operated as a single device, and/or included as components into a single device, wherein the device may include some or all of the hardware and/or software components illustrated in FIG. 10.

The server 112 may include a processor, microchip, central processing unit, or computer 700 that is in communication with or otherwise uses or includes one or more communication ports 702 for communicating with user devices, communications networks, and/or other devices. Communication ports may include such things as local area network adapters, telephone network communication devices, wireless communication devices, Bluetooth technology, etc. For example, the server 112 may include one or more communication ports to allow the server 112 to communicate via the communications network 114 to the computers or user devices 116, 118, 120. As another example, the server 112 may include one or more communication ports to allow the server to communicate directly with one or more of the computers 116, 118, 120 and/or directly with the PBX/switch 102. Similarly, the PBX/switch 102 might include one or more communication ports to allow the PBX/switch 102 to communicate with the telephones 104, 106, 108 and the server 112. In addition, the PBX/switch 102 may have a communication port that allows it to communicate via the communications network 110.

The server 112 also may include an internal clock element 704 to maintain an accurate time and date for the server 112, create time stamps for communications received or sent by the server 112, etc.

If desired, the server 112 may include one or more output devices 706 such as a printer, infrared or other transmitter, antenna, audio speaker, display screen or monitor, text to speech converter, etc., as well as one or more input devices 708 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 112 may include a memory or data storage device 710 to store information, software, databases, communications, device drivers, rules, etc. The memory or data storage device 710 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The server 112 also may include separate ROM 712 and RAM 714.

The processor 700 and the data storage device 710 in the server 112 each may be, for example: (i) located entirely within a single computer or other computing device; or (ii) connected to each other by a remote communication medium, such as a serial port cable, telephone line or radio frequency transceiver. In one embodiment, the server 112 may comprise one or more computers that are connected to a remote server computer for maintaining databases.

A conventional personal computer or workstation with sufficient memory and processing capability may be used as the server 112. In one embodiment, the server 112 operates as or includes a Web server for an Internet environment. The server 112 preferably is capable of high volume transaction processing, performing a significant number of mathematical calculations in processing communications and database searches. A Pentium™ microprocessor such as the Pentium III™ or IV™ microprocessor, manufactured by Intel Corporation may be used for the processor 700. Equivalent or other processors are available from Motorola, Inc., AMD, or Sun Microsystems, Inc. The processor 700 also may comprise one or more microprocessors, computers, computer systems, etc.

Software may be resident and operating or operational on the server 112. The software may be stored on the data storage device 710 and may include a control program 716 for operating the server, databases, etc. The control program 716 may control the processor 700. The processor 700 preferably performs instructions of the control program 716, and thereby operates in accordance with the present invention, and particularly in accordance with the methods described in detail herein. The control program 716 may be stored in a compressed, uncompiled and/or encrypted format. The control program 716 furthermore includes program elements that may be necessary, such as an operating system, a database management system and device drivers for allowing the processor 700 to interface with peripheral devices, databases, etc. Appropriate program elements are known to those skilled in the art, and need not be described in detail herein.

The server 112 also may include or store information regarding users, user devices, telephones, computers, rules, originating telephone numbers, communications, etc. For example, information regarding one or more rules may be stored in a rule information database 718 for use by the server 112 or another device or entity. Information regarding one or more calls may be stored in a call information database 720 for use by the server 112 or another device or entity. In some embodiments, some or all of one or more of the databases may be stored or mirrored remotely from the server 112.

According to an embodiment of the present invention, the instructions of the control program may be read into a main memory from another computer-readable medium, such as from the ROM 712 to the RAM 714. Execution of sequences of the instructions in the control program causes the processor 700 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 700, communication port 702, clock 704, output device 706, input device 708, data storage device 710, ROM 712, and RAM 714 may communicate or be connected directly or indirectly in a variety of ways. For example, the processor 700, communication port 702, clock 704, output device 706, input device 708, data storage device 710, ROM 712, and RAM 714 may be connected via a bus 724.

While specific implementations and hardware configurations for the server 112 have been illustrated, it should be noted that other implementations and hardware configurations are possible and that no specific implementation or hardware configuration is needed. Thus, not all of the components illustrated in FIG. 10 may be needed for a server implementing the methods disclosed herein. In some embodiments, a user device, one or more of the computers 116, 118, 120, and/or the PBX/switch 102 or 602 may have the same structure or configuration as the server 112 illustrated in FIG. 10 and/or include some or all of the hardware/software components of the server 112.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for processing a call, comprising:
   identifying a call to a busy telephone number;
   determining at least one rule for queuing said identified call;
   providing information regarding said at least one rule for queuing said identified call;
   queuing said identified call based on said at least one rule for queuing said identified call and said provided information;
   causing at least a portion of said information to be displayed on a user device displaying at least a portion of said information on a user device; and
   providing an ability to re-queue said identified call different than said queuing based on said at least one rule for queuing.

2. The method of claim 1, wherein said identifying a call to a busy telephone number includes determining that said telephone number is busy.

3. The method of claim 1, wherein said determining at least one rule for queuing said identified call includes retrieving information regarding said at least one rule from a database.

4. The method of claim 1, wherein said determining at least one rule for queuing said identified call includes receiving information regarding said at least one rule from a device associated with said busy telephone number.

5. The method of claim 1, wherein said providing information regarding said identified call includes providing said information to a device associated with said busy telephone number.

6. The method of claim 1, wherein said queuing said identified call for said telephone number in accordance with said at least one rule includes placing said call in a queue in a position ahead of a previously received call at said telephone number.

7. The method of claim 1, further comprising:
   receiving said identified call.

8. The method of claim 1, wherein said at least one rule has an associated queue level.

9. The method of claim 1, wherein said at least one rule has an associated visual alert.

10. The method of claim 1, further comprising:
    causing at least a portion of said at least one rule to be displayed on a user device.

11. The method of claim 1, further comprising:
    directing said call in accordance with said at least one rule.

12. The method of claim 1, further comprising:
    determining said information.

13. The method of claim 1, further comprising:
    determining that said telephone number is busy.

14. The method of claim 1, further comprising:
    receiving an indication of said at least one rule.

15. The method of claim 1, further comprising:
    identifying a person associated with said telephone number.

16. A system for processing a call, comprising:
    a memory;
    a communication port; and
    a processor connected to said memory and said communication port, said processor being operative to:
    identify a call to a busy telephone number;
    determine at least one rule for queuing said identified call for said busy telephone number;

provide information regarding said at least one rule for queuing said identified call;

queue said call in accordance with said at least one rule for queuing said identified call and said provided information;

cause at least a portion of said information to be displayed on a user device displaying at least a portion of said information on a user device; and provide an ability to re-queue said identified call different than said queuing based on said at least one rule for queuing.

17. A computer program product in a computer readable medium for processing a call, comprising:

instructions for determining that a call is directed to a busy telephone number;

instructions for identifying at least one rule for queuing said identified call for said busy telephone number;

instructions for sending information regarding said at least one rule for queuing said identified call;

instructions for positioning said call in a call order in accordance with said at least one rule for queuing said identified call and said information;

instructions for causing at least a portion of said information to be displayed on a user device displaying at least a portion of said information on a user device; and instructions for providing an ability to re-queue said identified call different than said queuing based on said at least one rule for queuing.

* * * * *